Figure 1:
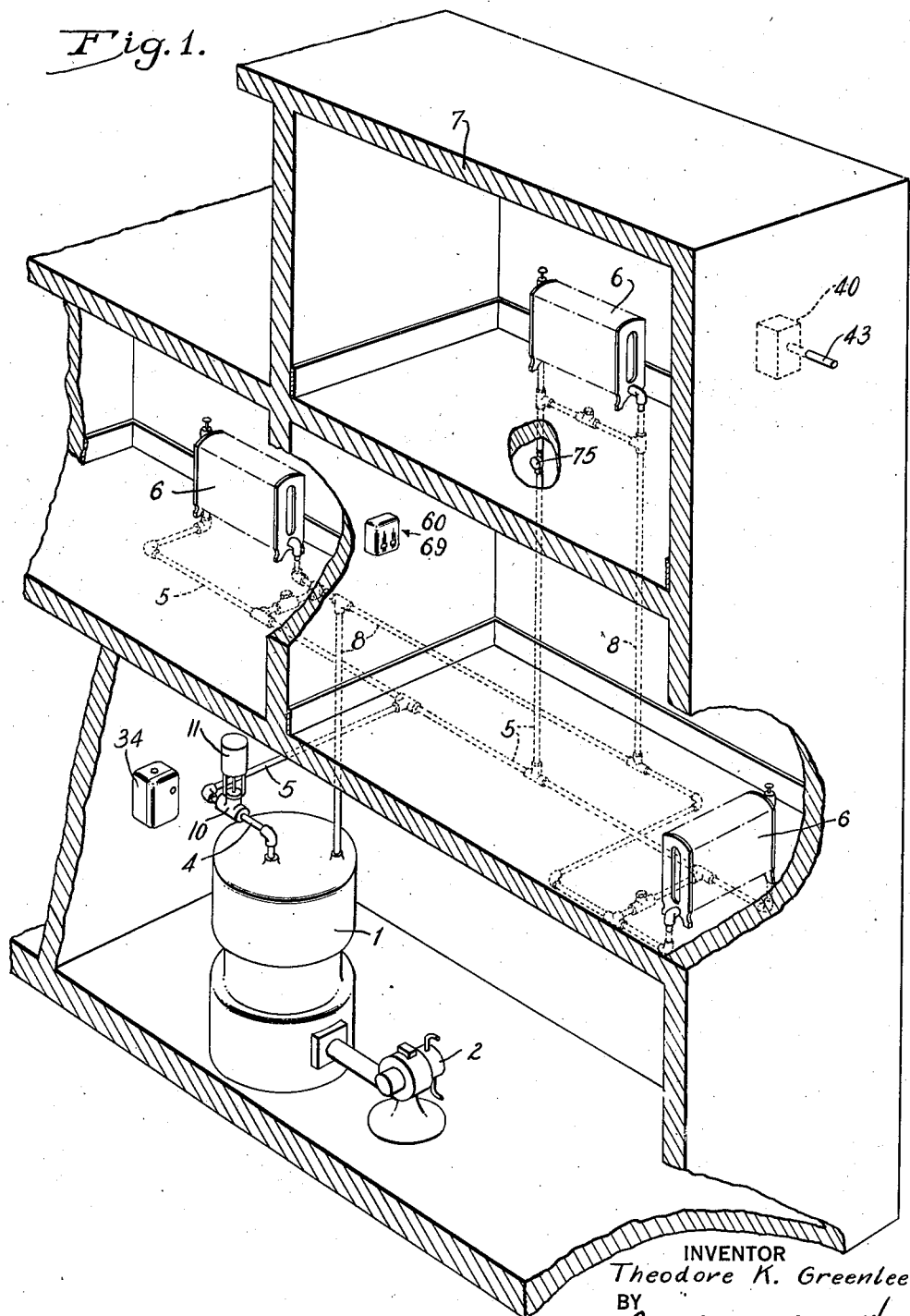

March 10, 1942.    T. K. GREENLEE    2,275,427
CONTROL FOR AIR CONDITIONING SYSTEMS
Filed March 16, 1938    2 Sheets-Sheet 1

INVENTOR
Theodore K. Greenlee
BY
Parker, Carlson, Pitzner & Hubbard
ATTORNEYS

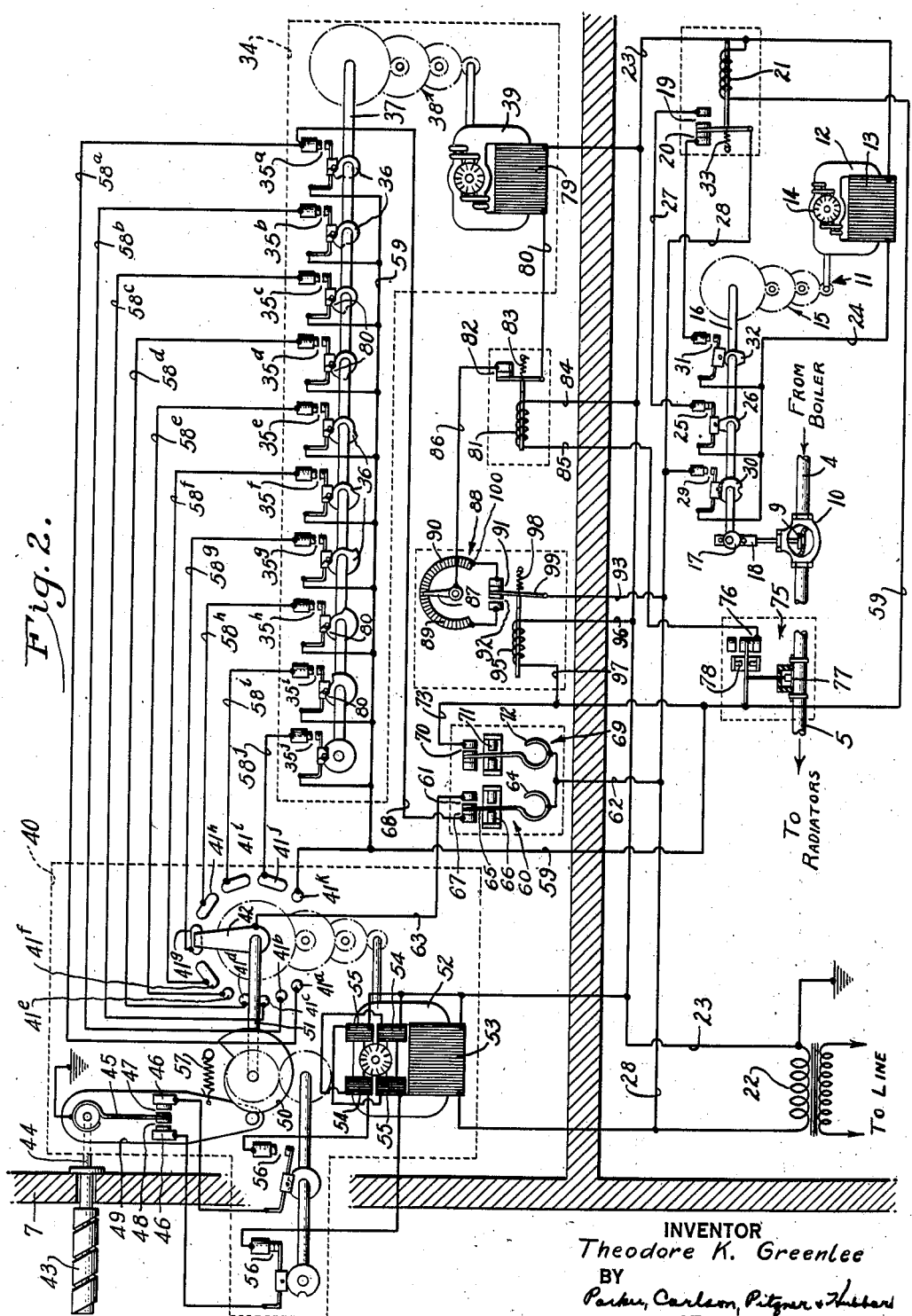

Patented Mar. 10, 1942

2,275,427

UNITED STATES PATENT OFFICE 2,275,427

CONTROL FOR AIR CONDITIONING SYSTEMS

Theodore K. Greenlee, Rockford, Ill., assignor to Barber-Colman Company, Rockford, Ill., a corporation of Illinois Application March 16, 1938, Serial No. 196,104

7 Claims. (Cl. 236—91)

This invention relates generally to the control for air conditioning systems and more particularly to controls of the type in which, when the control is active, the supply of medium for conditioning a space is turned on and off periodically, the on and off intervals being varied in a manner such as to maintain a uniform condition in the space.

The general object of the present invention is to modify the cyclic operation in a control of the above character in a manner such as to improve the degree of uniformity with which the condition being controlled may be maintained.

Another object is to provide for disabling the free cyclic control mechanism and permit the free flow of conditioning medium to the space to be conditioned until a supply of the medium becomes effective in or adjacent said space.

A further object is to provide in a cycler control system a novel adjusting mechanism for facilitating adaptation of the system to the individual characteristics of the air conditioning installation to be controlled.

Still another object is to provide a cycler control for building heating systems in which the periods are changed automatically with smaller increments of outside temperature change in mild weather than in severe weather.

The invention also resides in certain novel features of the cycler control mechanism which facilitate carrying out the foregoing objects.

Other objects and advantages of the invention will become apparent from the following detailed description taken in connection with the accompanying drawings in which Figure 1 is a fragmentary view of a building equipped with a control embodying the present invention.

Fig. 2 is a schematic view and wiring diagram.

While the control may be applied to various types of conditioning systems, it is especially useful in the control of so-called zone heating systems. Accordingly, the invention is illustrated in the drawings and will be described herein as applied to such use. It is to be understood, however, that I do not intened to limit the invention by such disclosure but aim to cover all modifications and alternative constructions and methods falling within the spirit and scope of the invention as expressed in the appended claims.

The heating system shown in the drawings is of the direct radiation type, comprising a boiler 1 heated in any preferred way as by an oil burner 2 and constituting the primary source of heat. Fluid heated in the boiler is conveyed through a main supply pipe 4 and branch pipes 5 to radiators 6 located in different parts of a zone of the building 7, the fluid being returned through a pipe line 8. Other supply pipes may branch from the boiler outlet to supply fluid to other zones of the building.

The flow of heated fluid to each zone is controlled by an individual regulating member operable according to its position to turn the supply of heat to the zone on and off. While the regulating member may take various forms, such as a switch element or the like directly controlling the burner 2, a draft damper, a water circulator, it comprises in the present instance the member 9 of a valve 10 which is movable between open and closed positions to permit and interrupt the flow of heated fluid from the boiler to the radiators.

As applied to such a heating system, the present invention first involves turning the heat to each zone alternately on and off under normal operating conditions in periods which may be adjusted manually to adapt the control to the characteristics of the individual zones and the heating apparatus therefor and are also varied automatically in length to adjust the maximum heating capacity of the individual zone heating apparatus to correspond to the prevailing rate of heat loss from the zone as measured, for example, by the outside temperature. In addition, the invention contemplates disabling the cycler control, for example, after a period of night shut-down, so as to permit of a continuous flow of heating medium to the different zones and thereby quickly establish the conditions best suited for effective operation of the cycler control. Provision is also made for changing the lengths of the on and off periods in response to different increments of outside temperature during mild weather than in cold weather so that more accurate regulation of the zone temperatures may be obtained under all weather conditions.

Herein, the regulating valve 10 for each zone is actuated by a power operator 11 comprising an electric motor 12 having a main winding 13 and a rotor 14 connected by speed reduction gearing 15 to a shaft 16 carrying a cam 17 which, in successive half revolutions of the shaft, operates a follower 18 to alternately open and close the valve. The valve opening and closing periods of the operator are initiated by closure of switches 19 and 20 respectively actuated by an electromagnet 21. Closure of the switch 19 completes a starting circuit for the motor 12 extending from a source 22 of alternating current through a conductor 23, the winding 13, a conductor 24, a switch 25 which is closed by a cam 26 when the valve is closed, a conductor 27, the switch 19, and a power conductor 28. When the motor is thus started, its operation is maintained by closure of a parallel circuit through a switch 29 which is allowed to open by a cam 30 after a half revolution of the shaft 16, the switch 25 having been opened in the meantime. Similarly, when the switch 20 is closed, a starting circuit is established through a switch 31 which is closed by a cam 32 when the valve is in open position. The armature of the relay 21 is biased by a spring 33 in a direction to close the switch 20 so that the switch 19 will be held closed and the steam valve open only while the relay is energized.

Supplying of heat to the zone radiators intermittently is effected in the present instance by a cycler or timing mechanism indicated generally at 34 comprising a series of switches 35 operated by cams 36 on a shaft 37 driven through appropriate speed reduction gearing 38 by an electric motor 39 which may be of the alternating current type. The cams 36 are so shaped that the associated switches 35 will be closed for different proportions of each revolution of the shaft 37. The switch 35$^a$ may, for example, be held closed by its cam seven per cent of each revolution, the switch 35$^e$ fifty per cent, and the switch 35$^j$ ninety per cent, the other switches being graduated correspondingly.

The switches 35 are placed in active control of the magnet 21 one at a time by the action of a selectively operable thermostatic adjuster indicated generally at 40. This mechanism comprises a plurality of contacts 41 arranged in a circular series for engagement by an arm 42 which assumes different angular positions according to the prevailing rate of heat loss from the zone as evidenced, for example, by the prevailing temperature of the air outside of the building. Such changes are detected by a helically coiled thermostatic element 43 fixed at one end and attached at its other end to a shaft 44 which projects through the wall of the building and carries a contact arm 45 movable back and forth between two contacts 46 with which the arm cooperates to form control switches 47 and 48. The contacts 46 are carried by an arm 49 swingable about the axis of the shaft 44 and constituting the follower of a cam 50 fast on a shaft 51 which carries the switch arm 42. This shaft is driven through speed reduction gearing by a reversible induction motor 52 having a main winding 53 constantly energized from the alternating current source 22. The direction of operation of the motor is controlled by two sets of shading coils 54 and 55 which are short-circuited selectively by the switches 47 and 48 through conductors in which are interposed cam operated switches 56 for limiting the range of movement of the shaft 51 by the motor 52.

When both of the switches 47 and 48 are open, the motor 52 is idle and the position of the switch arm 49 remains fixed. In response to a fall in the outside temperature, the switch 48 will be closed by the thermostatic element 43 thereby short-circuiting the shading coils 55 and initiating operation of the motor in a direction to turn the switch arm 42 and the cam 50 in a clockwise direction. As an incident to this movement, the contact arm 49 will be moved gradually by the rising surface of the cam 50 in a direction to open the switch 48. Such opening will occur when the cam has turned through an angle corresponding in magnitude to the amount of fall in the outside temperature. In a similar way, the shading coils 54 are short-circuited and counterclockwise movement of the arm 42 is initiated in response to closure of the switch 47 by a rise in the outdoor temperature. In such a case, operation of the motor continues until the falling surface of the cam has permitted the arm 49 to swing under the action of the spring 57 until the switch 47 has been opened at the higher outside temperature.

As a result of this follow-up action of the thermostatic adjuster 40, the switch arm 42 will swing back and forth and engage different ones of the stationary contacts 41 as the outside temperature changes. Preferably, the arrangement is such that the contact 41$^a$ is engaged as shown at an outside temperature of approximately sixty-five degrees, the contacts 41$^b$ to 41$^e$ being engaged in succession as the outside temperature falls in five degree increments. The contacts 41$^f$ to 41$^j$ are made of greater arcuate length and are spaced farther apart than the other contacts so as to be engaged in movements of the arm 42 corresponding to ten degree increments of fall in the outside temperature, the contact 41$^j$ being engaged when the outside temperature is five degrees Fahrenheit below zero. Movement of the arm 42 is correlated with the outside temperature by proper shaping of the cam 50. The limit positions determined by the switches 56 correspond to the positions of the contact 41$^a$ and a contact 41$^k$.

The stationary contacts 41$^a$ to 41$^j$ of the thermostatic adjuster are connected by conductors 58$^a$ to 58$^j$ to the stationary contacts of the corresponding cam operated switches 35$^a$ to 35$^j$ respectively. The movable contacts of the cam actuated switches are connected to a common conductor 59 which extends to one terminal of the valve control magnet 21. The other terminal of the latter is connected to one terminal of the power line 23.

For a purpose to appear later, the lobes on the cams 36, although made of different lengths in order to provide for step-by-step adjustment of the lengths of the heat-on periods, are all positioned with their leading ends 80 in the same angular position. Therefore, all of the switches 35 are closed substantially simultaneously in the movement of the shaft 37.

In order to prevent delivery of heat or to reduce the rate of delivery to a minimum when the zone becomes overheated, a thermostat 60 is located at a representative point in the zone and provided with a switch 61 interposed in the energizing circuit for the valve control magnet 21. For this purpose, the relay circuit is extended from the power line 28 through a conductor 62, the thermostat switch 61, and a conductor 63 leading to the arm 42 of the thermostat adjuster. The thermostat 60 comprises a thermostatic element 64 carrying a contact tongue 65 which cooperates with a stationary contact to form the switch 61. A magnet 66 acting on the tongue 65 as an armature operates to cause movement of the tongue with a snap action. By suitable adjusting mechanism, the thermostat may be conditioned so that the switch 61 will be closed whenever the zone temperature falls below the maximum limit desired to be maintained in the zone and will be open whenever the zone temperature rises above this limit.

Instead of disabling the steam supply completely in the event that the zone becomes overheated as evidenced by opening of the thermostat switch 61, it is desirable from the standpoint of comfort to the occupants of the zone to continue the supply of heat for short widely spaced intervals. Accordingly, the invention contemplates shifting the cycler control to the shortest on period switch 35ª as soon as the room thermostat switch becomes opened. As an incident to such opening, which occurs with a snap action, a switch 67 of the thermostat is closed. Through a conductor 68, this connects the stationary contact of the switch 35ª to the thermostat tongue thereby shunting out the thermostat adjuster 40. With the circuits thus conditioned, the steam valve will be opened during the small proportion of the time that the switch 35ª is closed. As a result, short bursts of steam will be admitted to the zone so that the heating apparatus will be kept warm and normal circulation of the air continued.

To preclude a possibility of the zone temperature falling below a low limit value, means is provided for causing opening of the steam supply valve independently of the cycler control. This means includes a thermostat 69 associated with the zone thermostat 60 and having a switch 70 which is held closed by a magnetic detent 71 whenever the zone temperature to which a thermostatic element 72 responds falls below the desired low limit value. The terminals of this switch are connected to the conductor 62 and by a conductor 73 to the conductor 59. It will be seen that whenever the switch 70 is closed, the valve control magnet will be energized through a circuit in parallel with and independently of the main thermostat switch 61 and the cycler switches. The steam supply is thus turned on and so maintained until the zone has been heated above the low limit temperature.

After the heating system has been idle during the night or for a prolonged interval due to other causes, the radiators and the piping may become cooled to such an extent that heat may not become available and be delivered to the zone during the first on period following closure of the room thermostat switch 61. To obviate the possibility of the zone becoming underheated to an objectionable degree under such conditions, the invention contemplates disabling the cycler control so as to permit of a continuous flow of heated fluid toward the radiators until heat is available for substantially immediate transfer to the space being heated. This function may be performed in response to the building up of a predetermined temperature or pressure in one of the steam lines 5 at a point preferably adjacent one of the radiators or in response to rises in the temperature at such a point.

In the present instance, the disabling mechanism includes a thermostat 75 arranged to detect a rise in the temperature of the steam pipe 5 to a predetermined value as evidenced by opening of a switch 76 of the thermostat. As shown, the latter is a surface type of instrument of the character disclosed in Patent No. 1,996,907 having a thermostatic element 77 which follows the changes in the steam pipe temperature and maintains the switch 76 closed whenever the temperature is below the value for which the thermostat is set to respond. A magnetic detent 78 causes operation of the switch with a snap action.

Preferably, though not necessarily, the control by the thermostat 75 is exercised in a manner such that as soon as heat becomes available at the radiators and the control of the steam valve 10 is restored to the cycler mechanism, the latter will begin to execute one of its heat on periods. To this end, the surface thermostat 75, in addition to initiating opening of the steam valve, also operates in response to a call for heat by the thermostat 60 when the heating apparatus is cold to interrupt the operation of the cycler drive motor 39 with cam shaft 37 just beyond the position at which the then active cycler switch 35 is closed. This action is obtained through the use of a magnetic relay 81 having a switch 82 biased to closed position by a spring 83 and held open when the relay is energized. The energizing circuit for the relay winding extends from the power lead 23 through a conductor 84, the winding 81, a conductor 85, the thermostat switch 76, the conductor 59, the then active cycler switch 35, one of the conductors 58, a contact 41, the arm 42, the conductor 63 the room thermostat switch 61, and the conductor 62 to the other power lead 28.

The switch 82 controls the circuit for the timing motor 39 which circuit extends from the power lead 23 through the motor winding 79, a conductor 80, the switch 82, a conductor 86, the wiper arm 87 of a rheostat 88, one side 89 or the other 90 of the resistance element of the rheostat, one of two switches 91 and 92, a conductor 93 to the other power lead 28. It will thus be seen that this circuit will be closed and the timing motor stopped with the active cycler switch 35 closed by the leading end portion 80 of its associated cam 36 whenever the thermostat switches 61 and 76 are closed. At all other times, that is, when any one of these three switches is open, the magnet 81 will be deenergized and the timing motor will run continuously. Therefore, as soon as heat becomes effective at the radiators and the magnet 81 becomes deenergized to restore the control of the cycler mechanism by starting its driving motor, a heat on period will be executed immediately and a supply of heat will actually be delivered to the zone without further delay.

The cycler control above described which operates independently of the zone temperature under normal conditions, that is, when the zone is not overheated, is well suited to the maintenance of uniform zone temperature provided that the characteristics of the cycler are properly correlated with those of the particular heating apparatus and of the zone in question. Such correlation may involve quite accurate adjustment of the lengths of the heat on periods measured by the cycler mechanism especially after the original installation of the control apparatus. To provide for such adjustment without the necessity of changing the cams 36, the invention provides a system for controlling the speed of the timing motor 39 so that the heat on periods defined by each cam 36 may be lengthened or shortened and the intervening heat off periods correspondingly shortened and lengthened respectively, thereby varying the percentage of the time during which the heat will be turned on under the control of the cam.

The foregoing functions are performed in the present instance by the rheostat 88 previously mentioned acting in conjunction with a magnetic relay 95 which is arranged to be energized while the active cycler switch 35 is closed, that is, during the heat on period, and to be deenergized during the heat off period. For this purpose, one terminal of the relay is connected by a conductor 96 to the power lead 23 and the other terminal is joined by a conductor 97 to the conductor 73 which is connected to the power lead 28 in the manner previously described through the room thermostat switch 61, the thermostat adjuster 40, and the active cycler switch 35.

When the relay is deenergized, a spring 98 acting on an arm 99 biases the latter in a direction to close the switch 91. In this case, the portion 90 of the rheostat resistance between the wiper arm 87 and the terminal 100 is interposed in the motor circuit so that the motor speed and the length of the heat off period will be proportional to the value of this resistance. This value may be increased and decreased as desired by manually turning the wiper arm 87 counter-clockwise and clockwise respectively.

When the active cycler switch 35 is closed, the relay 95 is energized causing closure of the switch 92. In this instance, the remainder 89 of the rheostat resistance is included in the timing motor circuit and the length of the heat-on period will be proportional to the value of this resistance. The resistances 89 and 90, acting in conjunction with the relay 95, constitute separately operable devices for controlling the speed of the cycler motor 39 which, except in the mid-position of the wiper arm 87, operates at different speeds during the heat on and heat off periods.

Operation

For the purpose of explaining the operation of the control above described, let it be assumed the zone temperature is below the selected high limit value, for example, 75 degrees Fahrenheit, established by the setting of the zone thermostat 60. The switch 61 is thus closed. Also, assume that the parts are positioned as shown in Fig. 2 after shut-down of the primary heater for a period of sufficient duration to permit cooling of the riser thermostat 75 below its control point, usually between 175 and 200 degrees. If the prevailing outside temperature is twenty-five degrees, for example, the thermostat adjuster 40 will have positioned the arm 42 on the contact 41ᵉ thereby rendering the cycler switch 35ᵉ active.

Under the assumed conditions, the relay 81 would be deenergized due to the open condition of the cycler switch 35ᵉ, operation of the timing motor 39 being maintained by the then closed switch 82. When the switch 35ᵉ becomes closed by its cam 36 in the continued rotation of the shaft 37, the valve control relay 21 is energized to close the switch 19 and thereby initiate an opening movement of the valve operator 11, this period being terminated when the regulating member 9 reaches full open position. Following opening of the valve, heated fluid begins to flow through the piping to the radiators in the zone. The energizing circuit for the winding 21 extends from the current source 22 through the power lead 23, winding 21, conductor 59, then closed switch 35ᵉ, conductor 58ᵉ, contact 41ᵉ, switch arm 42, conductor 63, then closed switch 61 of the room thermostat, and conductors 62 and 28.

Closure of the cycler switch 35ᵉ also completes an energizing circuit for the winding of the timing motor control relay 81. This circuit extends from the power source through the conductors 28 and 62, room thermostat switch 61, conductor 63, arm 42, contact 41ᵉ, conductor 58ᵉ, switch 35ᵉ, conductor 59, switch 76 of the surface thermostat, winding 81, and conductors 84 and 23. Energization of this relay opens the switch 82 and thereby interrupts the operation of the timing motor 39 with the cycler switch 35ᵉ held closed by the leading portion 80 of its cam 36. With the parts thus conditioned, the cycler is disabled from interrupting the flow of heated fluid to the zone so that such flow continues at a maximum rate so long as the surface thermostat switch 76 remains closed.

When heating fluid has become available at the radiators in the zone as evidenced by a rise in the temperature of the supply pipe 5 at the point of location of the surface thermostat 75 to 175 degrees, the switch 76 of the latter is opened to place the cycler mechanism in control of the steam valve. Thus, opening of the surface thermostat switch 76 interrupts the energizing circuit for the relay winding 81, thereby permitting the switch 82 to close and establish the circuit through the energizing circuit for the timing motor. The latter circuit extends from the current source through conductor 23, motor winding 79, conductor 80, switch 82, conductor 86, wiper arm 87, resistance 89, switch 92, which is then closed due to energization of the magnet 95, and conductors 93 and 28. The timing motor runs at a speed determined by the setting of the rheostat arm 87 and the value of the resistance 89.

When the high point of the cam 36 passes the follower of the cycler switch 35ᵉ, the latter opens thereby interrupting the circuit of the magnet 21, the switch 20 of which then becomes closed. In response to this, a closing movement of the valve operator 11 is executed and the valve remains closed while the cycler switch 35ᵉ remains open. Opening of the latter switch to initiate a heat off period also interrupts the energizing circuit for the magnet 95 as a result of which the spring 98 operates to open the switch 92 and immediately close the switch 91. This withdraws the portion 89 of the resistance from the timing motor circuit and interposes the portion 90 therein so that during the heat off period, the speed of the motor is determined by the value of the resistance 90.

So long as the room thermostat switch 61 remains closed, the cycler mechanism will operate in the manner above described to maintain the steam valve open while the cycler switch 35ᵉ is closed and closed while this switch is open. As an incident to each change in the condition of the cycler switch, the switch arm 99 will be shifted under the control of the magnet 95 so that during the heat on periods, the resistance 89 will control the speed of the motor, this speed being controlled by the resistance 90 during the heat off periods. If it is desired to change the temperature maintained in the zone by operation of the cycler in the manner above described or in order to adjust the cycler mechanism after initial installation to adapt it to the characteristics of the zone which it controls, it is merely necessary to shift the setting of the rheostat 88. By turning the rheostat arm 87 in a clockwise direction, the speed of the timing motor is increased during the heat off periods and correspondingly decreased during the heat on periods thereby increasing the proportion of the time during which the heat is maintained on. By shifting the arm in the opposite direction, the speed of the timing motor during the heat on periods is increased and the proportion of the time that the heat remains on while any given cycler switch is in control is correspondingly shortened.

Let it now be assumed that, due to operation of the cycler mechanism in the manner above described, the zone becomes heated to a temperature above the control point of the room thermostat 60. As a result of this, the switch 61 is opened and the switch 67 is closed. Closure of the latter transfers the control circuit of the valve control magnet 21 to the cycler switch 35$^a$ which produces the shortest heat on periods. The magnet circuit then extends from the current source through the conductor 23, winding 21, conductor 59, cycler switch 35$^a$, conductor 68, room thermostat switch 67, and conductors 62 and 28. Under these conditions, the heat to the zone will be turned on during the short interval when the cycler switch 35$^a$ is closed. As a result, the heating mechanism of the zone will be kept warm and objectionable cooling of any part of the zone will be obviated.

During normal operation of the cycler control, changes in the outside temperature simply shift the control from one cycler switch 35 to another. For example, if the outside temperature falls to fifteen degrees, the thermostat adjuster 40 will operate in the manner previously described to position the switch arm 48 on the contact 41$^h$. Thus, the cycler control is transferred from the switch 35$^g$ to the switch 35$^h$ with the result that the heat on periods are lengthened in accordance with the shape of the cam 36$^h$.

If during operation of the cycler control mechanism, the zone temperature falls below the low limit temperature, for example, 68 degrees for which the thermostat 69 is usually set, the switch 70 thereof will become closed and the steam valve will be maintained open continuously independently of the cycler control. In such a case, the energizing circuit for the valve controlled solenoid is from the current source through conductor 23, magnet 21, conductor 59, switch 70, and conductors 62 and 28. When the zone temperature has again risen above the low limit value, the control will be transferred back to the cycler mechanism by opening of the switch 70.

The control mechanism above described is also well suited to control a zone heating system by directly governing the control of the primary heater instead of the valve controlling the flow of heating fluid from the primary source to the zone. For example, if it is desired to control the burner 2 directly, the relay 21 would be associated with the usual burner controls in a manner such as to initiate operation of the burner when the magnet is energized to close the switch 19, operation of the burner being interrupted when the magnet is deenergized and the switch 19 opened. In such an application, the surface thermostat 75 or other equivalent control instrument plays an important part. This instrument would operate to permit continued operation of the burner until sufficient heat has been transferred to the fluid in the conveying system to render heat available in the zone. The possibility of objectionable cooling of the zones is therefore reduced to a minimum.

I claim as my invention:

1. The combination with apparatus for conveying air conditioning medium from a remotely located primary source to a space to be conditioned, a regulating member controlling the supply of said medium to said space and movable between on and off positions, a control device operable periodically in on and off periods to control the movements of said member and cause a flow of the medium toward said space during said on periods and interruption of the flow during the off periods, an actuator for said device normally operating to change the position of the device periodically, and means closely associated with said apparatus to follow temperature changes thereof independently of the space temperature and operating when the temperature of said apparatus at a point adjacent said space falls below a predetermined value to stop said actuator with said device in on position near the beginning of an on period.

2. The combination with apparatus for conditioning the air in a space, mechanism operable to turn said apparatus on and off intermittently, a motor driving said mechanism, separate devices each adapted when in control of said motor to determine the speed of operation thereof and selectively adjustable to establish a plurality of different motor speeds, means controlled by said mechanism for placing one of said devices in control of the motor during the on periods and the other device in control of the motor during the off periods, and a common actuator by which said devices may be adjusted in unison to increase the speed setting of one and correspondingly decrease the speed setting of the other.

3. The combination with apparatus for heating the space within a building of, normally operating timing mechanism controlling said apparatus to turn the heat alternately on and off during selectively variable periods, thermostatic means responsive to temperature changes outside of the building and operable to adjust the relative lengths of successive on and off periods and thereby vary the average rate of heat supply inversely with outside temperature changes, and thermostatic means responsive to temperature changes inside of said building and operable when the inside temperature rises above a predetermined value to render said outside thermostatic means ineffectual and to adjust said mechanism for continuance of the periodic supply of heat but at a predetermined lower average rate while the inside thermostatic means continues to call for less heat.

4. The combination with apparatus for conveying temperature changing medium to a space to be conditioned of, an electric timing motor, control mechanism operated periodically during operation of said motor to cause the supply of medium to said apparatus to be turned alternately on and off, switching means responsive to temperature changes of said apparatus and movable into either of two controlling positions, and a circuit controlled jointly by said switching means and said control mechanism and operable as an incident to turning on of said supply and upon said switching means being in one of said positions to discontinue the operation of said motor until the temperature of said apparatus has changed to a predetermined value.

5. The combination with apparatus for conveying temperature changing medium from a remotely located primary source to a space to be conditioned of, a timing motor, control means operated periodically during operation of said timing motor to cause the supply of said medium to be turned alternately on and off, means responsive to temperature changes of said apparatus and having a member movable to either of two control positions, and mechanism controlling the operation of said timing motor and operable as an incident to turning on of said supply and upon said member being in one of said positions to interrupt the effective operation of the motor until the temperature of said apparatus and said responsive means has deviated to a predetermined value, said responsive means acting to initiate operation of the motor upon movement of said member to said other control position.

6. The combination with apparatus for conveying heating medium to a space to be heated of, normally operating power driven timing mechanism operable to cause alternate interruption and resumption in the supply of heating medium to said apparatus, means responsive to temperature changes of said apparatus and having two controlling positions, and means controlled jointly by said responsive means and said timing mechanism and operable in response to turning on of the heat supply with said member in one of said control positions to interrupt effective operation of the timing mechanism and thereby defer timing of the heat on period until said member has been moved to the other of said positions.

7. The combination with apparatus for conveying temperature changing medium from a remotely located primary source to a space to be conditioned of, a timing motor, control means operated periodically during operation of said timing motor to cause the supply of said medium to be turned alternately on and off, means responsive to temperature changes of said apparatus and having a member movable to either of two control positions, mechanism controlling the operation of said timing motor and operable as an incident to turning on of said supply and upon said member being in one of said positions to interrupt the effective operation of the motor until the temperature of said apparatus and said responsive means has deviated to a predetermined value, said responsive means acting to initiate operation of the motor upon movement of said member to said other control position, and means operable irrespective of the position of said member to maintain said timing motor energized while the supply of said medium is turned off.

THEODORE K. GREENLEE.